United States Patent
Hwang et al.

(10) Patent No.: US 7,095,552 B2
(45) Date of Patent: Aug. 22, 2006

(54) RAMAN OPTICAL FIBER AMPLIFIER USING ERBIUM DOPED FIBER

(75) Inventors: Seong-Taek Hwang, Pyongtaek-shi (KR); Byung-Chang Kang, Seoul (KR); Yun-Je Oh, Yongin-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 454 days.

(21) Appl. No.: 10/271,845

(22) Filed: Oct. 15, 2002

(65) Prior Publication Data

US 2003/0215241 A1 Nov. 20, 2003

(30) Foreign Application Priority Data

May 17, 2002 (KR) ................ 2002-27327

(51) Int. Cl.
*H01S 4/00* (2006.01)
*H04B 10/12* (2006.01)

(52) U.S. Cl. .................... 359/334; 359/341.5
(58) Field of Classification Search ........... 359/334, 359/341.5
See application file for complete search history.

(56) References Cited

U.S. PATENT DOCUMENTS

| | | | | |
|---|---|---|---|---|
| 5,027,079 A * | 6/1991 | Desurvire et al. | ...... | 359/341.32 |
| 5,790,300 A * | 8/1998 | Zediker et al. | ...... | 359/334 |
| 6,204,960 B1 * | 3/2001 | Desurvire | ...... | 359/341.33 |
| 6,263,139 B1 | 7/2001 | Kawakami et al. | ...... | 385/123 |
| 6,359,725 B1 * | 3/2002 | Islam | ...... | 359/334 |
| 6,529,672 B1 * | 3/2003 | Blondel et al. | ...... | 385/140 |
| 6,819,477 B1 * | 11/2004 | Tsuzaki et al. | ...... | 359/334 |

FOREIGN PATENT DOCUMENTS

| | | |
|---|---|---|
| EP | 1180860 A1 | 2/2002 |
| JP | 2001-007768 | 1/2001 |
| JP | 2001-249369 | 9/2001 |

OTHER PUBLICATIONS

Namiki, S. and Emori, Y., "Ultrabroad-band Raman amplifiers pumped and gain-equalized by wavelength-division-multiplexed high-power laser diodes", IEEE Journal on selected topics in Quantum Electronics, vol. 7, No. 1, (Jan. 2001).*

Agrawal, G. V., Fiber Optic Communication Systems, 3rd ed. , p. 422 (May, 2002).*

* cited by examiner

*Primary Examiner*—Jack Keith
*Assistant Examiner*—Eric Bolda
(74) *Attorney, Agent, or Firm*—Cha & Reiter, L.L.C.

(57) ABSTRACT

A Raman optical-fiber amplifier used in a wavelength-division-multiplexing optical communication system is provided. The inventive amplifier includes an optical transmitter for transmitting wavelength-division-multiplexed optical signals through an optical fiber and an optical receiver for receiving the optical signals through the optical fiber, and further comprises an erbium-doped fiber which Raman-amplifies and outputs optical signals inputted through the first end of the erbium-doped fiber amplifier connected with the optical fiber; a pumping source which outputs pump light with a predetermined wavelength so as to Raman-pump the erbium-doped fiber; and, a wavelength-selective coupler which outputs the pump light to be introduced into the erbium-doped fiber.

6 Claims, 4 Drawing Sheets

RAMAN OPTICAL FIBER AMPLIFIER USING ERBIUM DOPED FIBER

CLAIM OF PRIORITY

This application claims priority to an application entitled "RAMAN OPTICAL FIBER AMPLIFIER USING ERBIUM DOPED FIBER," filed in the Korean Industrial Property Office on May 17, 2002 and assigned Serial No. 2002-27327, the contents of which are hereby incorporated by reference.

BACKGROUND OF THE INVENTION

1. Field of the Invention

The present invention relates to an optical communication system, and more particularly to a Raman optical-fiber amplifier disposed between an optical transmitter and an optical receiver in an optical communication system.

2. Description of the Related Art

Recently, a higher demand for more data has forced the increase of transmission capacity in wavelength-division-multiplexing optical communication systems (WDM optical communication systems). One way to increase transmission capacity is to increase the number of transmission channels or the transmission rate. The transmission rate has now been improved a great deal and ranges from 2.5 Gb/s to 10 Gb/s, but more efforts are being made to further increase the transmission rate. Known methods for increasing the transmission capacity includes the parallel coupling of a conventional C-band erbium-doped fiber amplifier (C-band EDFA) with a L-band erbium-doped fiber amplifier (L-band EDFA), and the use of a new amplification medium, such as a tulium-doped fiber and Rare-earth doped fiber amplifiers, have disadvantages in that the available amplification band is narrow and the noise factor tends to be high. As a solution to these limitations, research efforts have been focusing on the Raman optical-fiber amplifier.

FIG. 1 shows the construction of a conventional Raman optical-fiber amplifier. The Raman amplifier comprises a first to a fourth isolator 120, 160, 180, 220; a first and a second pumping source 140 and 200; a first and a second wavelength-selective coupler 130 and 190; an erbium-doped fiber 150; a connector 170; and, a dispersion-compensation fiber 210.

The first isolator 120 permits optical signals inputted into the Raman optical-fiber amplifier to pass without filtration while shutting out backward light—i.e., light emitted from the first wavelength-selective coupler 130. The first wavelength-selective coupler 130 couples optical signals emitted from the first isolator 120 and pumps light with a 980 nm or 1,480 nm wavelength emitted from the first pumping source 140, then outputs them to be introduced into the erbium-doped fiber 150.

The first pumping source 140 forward pumps the first erbium-doped fiber 150 by exciting erbium ions. A laser diode that outputs pump light with a 980 nm or 1,480 nm wavelength can be used as the first pumping source 140. As such, the erbium-doped fiber 150 is forward pumped by pump light emitted from the first wavelength-selective coupler 130 and amplifies and outputs optical signals emitted from the first wavelength-selective coupler 130. The second isolator 160 permits optical signals emitted from the erbium-doped fiber 150 to pass without filtration while shutting out backward light.

The connector 170 serves to connect the erbium-doped fiber amplification portion 230 at the front stage thereof and the Raman optical-fiber amplification portion 240 at the back stage thereof—i.e., an optical fiber 110 connected with the erbium-doped fiber amplification portion 230 and an optical fiber 110 connected with the Raman optical-fiber amplification portion 240. The connector 170 is provided with a circular hall therein.

The third isolator 180 permits optical signals emitted from the connector 170 to pass without filtration while shutting out backward light. The second wavelength-selective coupler 190 couples optical signals emitted from the third isolator 180 and Raman pump light emitted from the second pumping source 200 then outputs them to be introduced into the dispersion-compensation fiber 210. The second pumping source 200 Raman-pumps the dispersion-compensation fiber 210. A laser diode that outputs Raman pump light with a 1,450 nm band wavelength can be used as the second pumping source 200. The fourth isolator 220 permits optical signals emitted from the connector 170 to pass without filtration while shutting out backward light.

As seen from the above description, the conventional optical-fiber amplifier comprises two amplification portions 230 and 240—i.e., the erbium-doped fiber amplification portion 230 at the front stage of the connector 170 and the Raman optical-fiber amplification portion 240 at the back stage of the connector 170. For this reason, price competitiveness is lowered due to the requirement of multiple optical components. In addition, the increased total volume causes poor integration.

SUMMARY OF THE INVENTION

Therefore, the present invention has been made in view of the above problems, and it is an object of the present invention to provide a dispersion-compensated, Raman optical-fiber amplifier, in which the total manufacturing cost is inexpensive and the degree of integration is simplified compared to the prior art.

In accordance with one aspect of the present invention, provision of a Raman optical-fiber amplifier used in a wavelength-division-multiplexing optical communication system is provided and includes an optical transmitter and an optical receiver, wherein the optical transmitter transmits wavelength-division-multiplexed optical signals through an optical fiber and the optical receiver receives the optical signals through the optical fiber. The Raman optical-fiber amplifier comprises an erbium-doped fiber for amplification and outputs optical signals inputted through the first end of the erbium-doped fiber; a pumping source that outputs pump light with a predetermined wavelength so as to Raman-pump the erbium-doped fiber; and, a wavelength-selective coupler that outputs the pump light to be introduced into the erbium-doped fiber.

BRIEF DESCRIPTION OF THE DRAWINGS

The above features and other advantages of the present invention will be more clearly understood from the following detailed description taken in conjunction with the accompanying drawings, in which.

DETAILED DESCRIPTION OF THE PREFERRED EMBODIMENTS

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. For purposes of simplicity and clarity, detailed descriptions of well-known devices, circuits, and methods are omitted so as not to obscure the description of the present invention with unnecessary detail.

Figure 1:
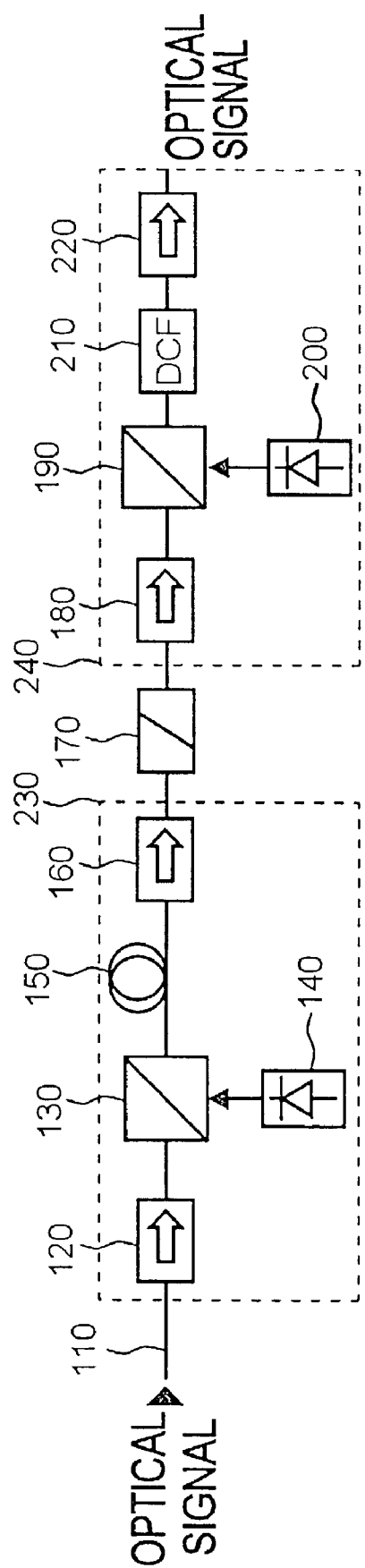
FIG. 1 is a view showing the construction of a conventional optical-fiber amplifier.
Figure 2:
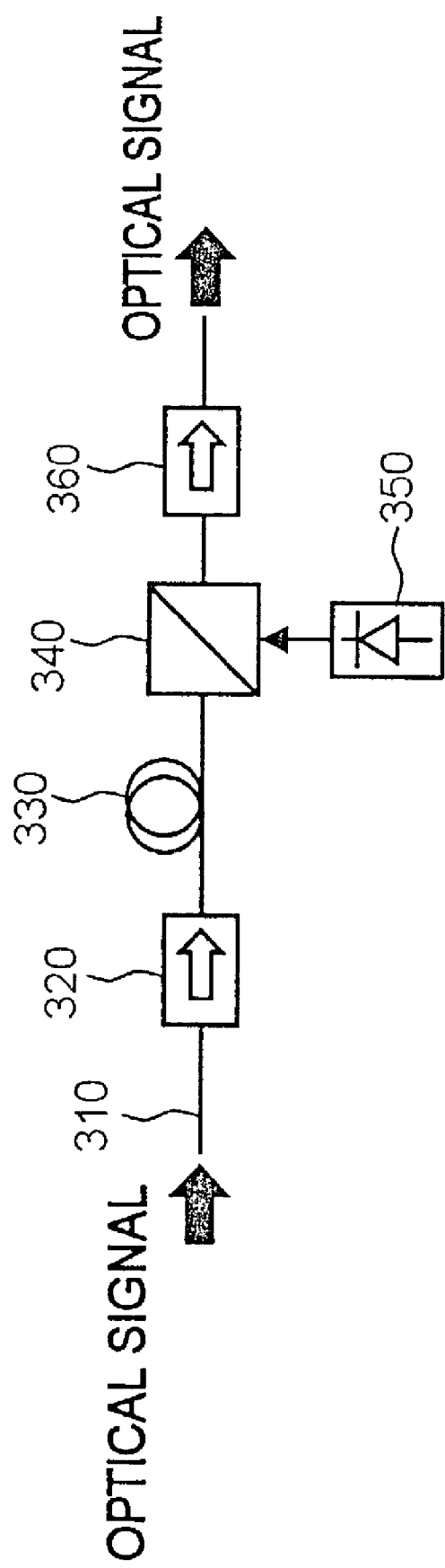
FIG. 2 is a view showing the construction of a Raman optical-fiber amplifier using an erbium-doped fiber in accordance with a first preferred embodiment of the present invention.

FIG. 2 shows the construction of a Raman optical-fiber amplifier using an erbium-doped fiber in accordance with a first preferred embodiment of the present invention. The Raman optical-fiber amplifier comprises a first and a second isolator 320 and 360, an erbium-doped fiber 330, a wavelength-selective coupler 340, and a pumping source 350.

In operation, the first isolator 320 permits optical signals inputted into the optical-fiber amplifier to pass without filtration while shutting out the backward light—i.e., light emitted from the erbium-doped fiber 330. Then, the erbium-doped fiber 330 Raman-amplifies and outputs optical signals emitted from the wavelength-selective coupler 340. The erbium-doped fiber 330 is backwardly Raman-pumped by pump light with a 1,450 nm wavelength in case the optical signals with a 1,550 nm wavelength are passed therethrough, and by pump light with a 1,480 nm wavelength in case the optical signals with a 1,580 nm wavelength are passed there-through. That is, the erbium-doped fiber 330 is backwardly Raman-pumped by pump light with a wavelength depending on the wavelength of the optical signals. In the case that the optical signals have channels of different wavelengths, the erbium-doped fiber can be backwardly Raman-pumped by pump light with different wavelengths. The intensity of pump light according to the wavelengths is preferably adjusted to output optical signals depending on the channels.

The erbium-doped fiber 330 has several km lengths to obtain a sufficient Raman gain and has a pump light absorption rate of less than 1.0 dB/km by setting an erbium concentration to a sufficiently low level. Where the erbium-doped fiber 330 with the above properties is backwardly Raman-pumped, amplification by erbium ions, one constituent of the erbium-doped fiber 330 (an amplification principle of a conventional erbium-doped fiber amplifier) and amplification by the vibration energy of silica, another constituent of the erbium-doped fiber 330 (an amplification principle of a Raman optical-fiber amplifier) are generated at the same time.

A Raman gain in a narrow wavelength band behaves according to the following equation 1:

$$G(\lambda) = \exp\left(\frac{g(\lambda)}{A_{eff}} P_p L_{eff}\right), \quad L_{eff} = \frac{1}{\alpha_p}(1 - e^{-\alpha_p L}) \quad \text{Equation 1}$$

wherein, $g(\lambda)$ represents a Raman-gain coefficient of an amplification medium, $P_p$ represents a pump light power, $A_{eff}$ represents an effective area of the pump light, $L_{eff}$ represents an effective length of an amplification medium, L represents the total length of an amplification medium, and $\alpha_p$ represents a loss value.

As seen from Equation 1, provided that $g(\lambda)$, $P_p$ and $L_{eff}$ are constant, a Raman gain is inversely proportional to $A_{eff}$. The smaller the core of an amplification medium to be used (the core of the optical fiber), the smaller the $A_{eff}$. As a result, a Raman gain is increased.

Generally, $A_{eff}$ of a communication optical fiber (monomode optical fiber) is 70 μm², $A_{eff}$ of a dispersion-transition fiber is 50 μm², $A_{eff}$ of a dispersion-compensation fiber is 20 μm², and $A_{eff}$ of an erbium-doped fiber is 15 to 20 μm². In this respect, where an erbium-doped fiber is used as an amplification medium, a similar Raman gain to that of a dispersion-compensation fiber used as the amplification medium of a Raman optical-fiber amplifier can be obtained.

The wavelength-selective coupler 340 permits optical signals emitted from the erbium-doped fiber 330 to pass without the filtration and outputs pump light emitted from the pumping source 350 to be introduced into the erbium-doped fiber 330.

The pumping source 350 backwardly Raman-pumps the erbium-doped fiber 330. A laser diode which outputs pump light with a predetermined wavelength can be used as the pumping source 350. The pump light may have wavelengths in the 1,425 nm to 1,520 nm range to cover the total amplification band (1,525 nm to 1,620 nm) of the erbium-doped fiber 330. Lastly, the second isolator 360 permits optical signals emitted from the wavelength-selective coupler 340 to pass without the filtration while shutting out backward light.

Figure 3:
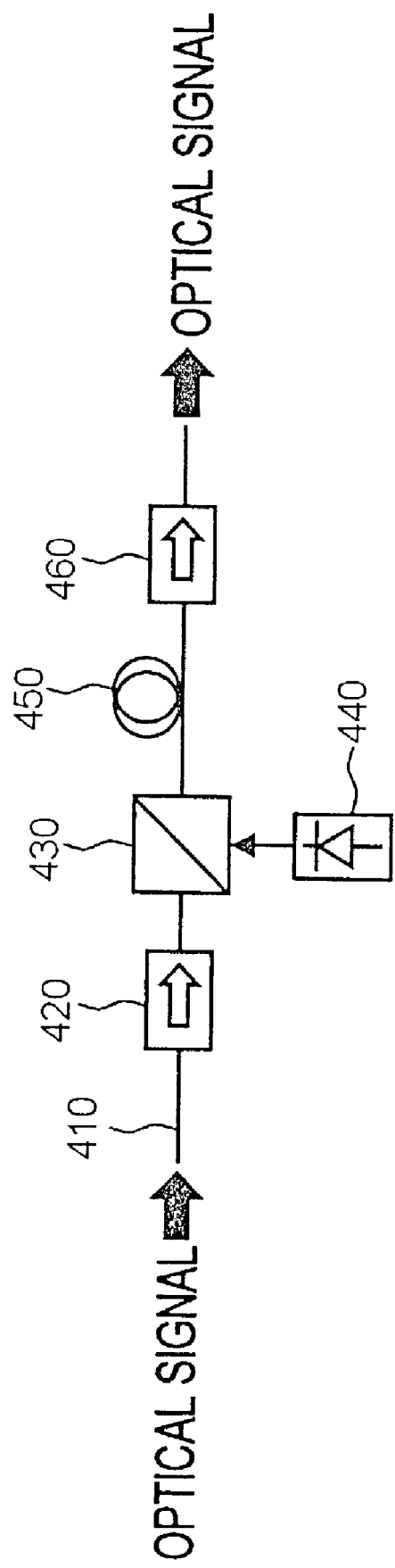
FIG. 3 is a view showing the construction of a Raman optical-fiber amplifier using an erbium-doped fiber in accordance with a second preferred embodiment of the present invention; and, FIG. 4 is a view showing the construction of a Raman optical-fiber amplifier using an erbium-doped fiber in accordance with a third preferred embodiment of the present invention.

FIG. 3 is a view showing the construction of a Raman optical-fiber amplifier using an erbium-doped fiber in accordance with a second preferred embodiment of the present invention. The Raman optical-fiber amplifier comprises a first and a second isolator 420 and 460, an erbium-doped fiber 450, a wavelength-selective coupler 430, and a pumping source 440. The construction of the Raman optical-fiber amplifier is the same as that shown in FIG. 2 except that the wavelength-selective coupler 430 and the pumping source 440 are disposed between the erbium-doped fiber 450 and the first isolator 420 to Raman-pump the erbium-doped fiber 450 in a forward direction. Therefore, a description of the construction, of the Raman optical-fiber amplifier shown in FIG. 3 will be omitted to avoid redundancy.

Figure 4:
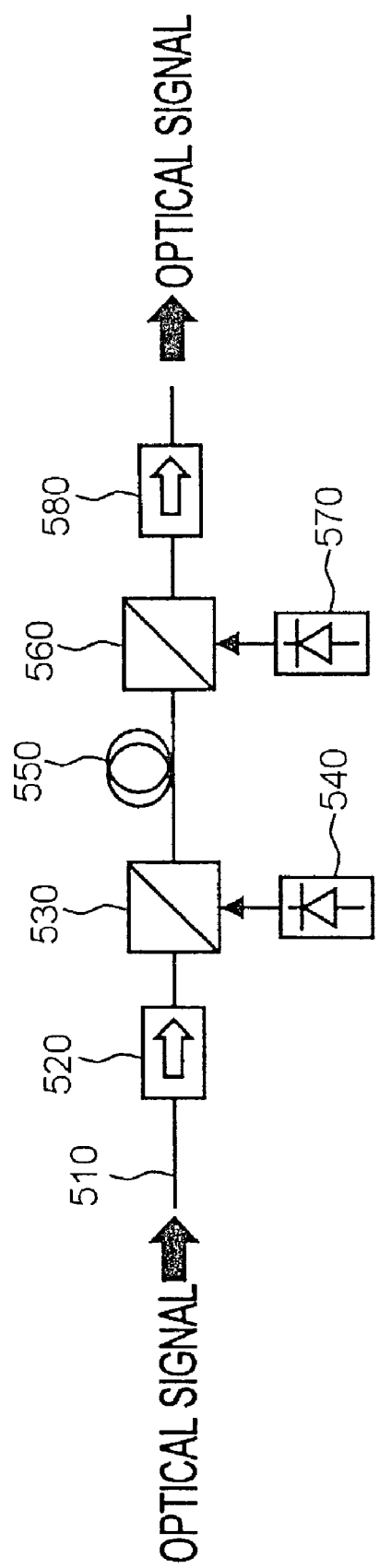

FIG. 4 is a view showing the construction of a Raman optical-fiber amplifier using an erbium-doped fiber in accordance with a third preferred embodiment of the present invention. The Raman optical-fiber amplifier comprises a first and a second isolator 520 and 580; an erbium-doped fiber 550; a first and a second wavelength-selective coupler 530 and 560; and, a first and a second pumping source 540 and 570.

The first isolator 520 permits optical signals inputted into the optical-fiber amplifier to pass without the filtration while shutting out backward light—i.e., light emitted from the wavelength-selective coupler 530. The erbium-doped fiber 550 Raman-amplifies and outputs optical signals emitted from the wavelength-selective coupler 530. The erbium-doped fiber 550 has several km lengths to obtain a sufficient Raman gain and has a pump-light absorption rate of less than 1.0 dB/km by setting an erbium concentration to a sufficiently low level. The first wavelength-selective coupler 530 couples optical signals emitted from the first isolator 520 and pump light emitted from the first pumping source 540, and outputs them to be introduced into the erbium-doped fiber 550. The first pumping source 540 forward Raman-pumps the erbium-doped fiber 550. The pump light may have wavelengths in the 1,425 nm to 1,520 nm range to cover the total amplification band (1,525 nm to 1,620 nm) of the erbium-doped fiber 550. The second wavelength-selective coupler 560 permits optical signals emitted from the erbium-doped fiber 550 to pass without the filtration and outputs pump light emitted from the second pumping source 570 to be introduced into the erbium-doped fiber 550. The second pumping source 570 backward Raman-pumps the erbium-doped fiber 550. The pump light may have wavelengths in the 1,425 nm to 1,520 nm range to cover the total amplification band (1,525 nm to 1,620 nm) of the erbium-doped fiber 550. The second isolator 580 permits optical signals emitted from the second wavelength-selective coupler 560 to pass without the filtration while shutting out backward light.

As apparent from the above description, the Raman optical-fiber amplifier according to the present invention combines a conventional erbium-doped fiber amplification portion and a conventional Raman optical-fiber amplification as one unit. Therefore, a low-cost amplifier can be fabricated and improved integration can be accomplished due to a reduced number of construction devices. Although the preferred embodiments of the present invention have been disclosed for illustrative purposes, those skilled in the art will appreciate that various modifications, additions, and substitutions are possible without departing from the scope and spirit of the invention as disclosed in the accompanying claims.

What is claimed is:

1. A Raman optical fiber amplifier using an erbium-doped fiber for a wavelength division multiplexing optical communication system having an optical transmitter for transmitting wavelength division multiplexed optical signals through an optical fiber and an optical receiver for receiving the optical signals through the optical fiber, comprising:

at least one erbium doped fiber having a light absorption rate of less than 1.0 dB/km in wavelength range of 1,425 nm to 1520 nm that Raman-amplifies and outputs optical signals in the wavelength range of 1,525 nm to 1620 nm inputted through a first end of the erbium-doped fiber connected with the optical fiber;

at least one pumping source providing pump light in the wavelength range of 1,425 nm to 1,520 nm so as to Raman-pump the erbium-doped fiber; and, at least one wavelength selective coupler for providing the pump light to be introduced into the erbium doped fiber.

2. The Raman optical fiber amplifier as set forth in claim 1, wherein the pumping source comprises a laser diode.

3. The Raman optical fiber amplifier as set forth in claim 1, further comprising an optical isolator.

4. A Raman optical fiber amplifier using an erbium doped fiber for a wavelength division multiplexing optical communication system having an optical transmitter for transmitting wavelength division multiplexed optical signals through an optical fiber and an optical receiver for receiving the optical signals through the optical fiber, comprising:

at least one erbium doped fiber having a light absorption rate of less than 1.0 dB/km in wavelength range of 1,425 nm to 1,520 nm that Raman-amplifies and outputs optical signals in the wavelength range of 1,525 nm to 1,620 nm inputted through a first end of the erbium doped fiber connected with the optical fiber;

at least one first pumping source providing pump light in the wavelength range of 1,425 nm to 1,520 nm so as to forward Raman-pump the erbium-doped fiber;

at least one first wavelength selective coupler for providing the pump light emitted from the first pumping source to be introduced into the erbium doped fiber;

at least one second pumping source providing pump light in the wavelength range of 1,425 nm to 1,520 nm so as to backward Raman-pump the erbium-doped fiber; and, at least one second wavelength selective coupler for providing the pump light emitted from the second pumping source to be introduced into the erbium doped fiber.

5. The Raman optical fiber amplifier as set forth in claim 4, wherein the pumping source comprises a laser diode.

6. The Raman optical fiber amplifier as set forth in claim 4, further comprising an optical isolator.

* * * * *